United States Patent
Anderson et al.

(10) Patent No.: US 9,354,323 B2
(45) Date of Patent: *May 31, 2016

(54) SATELLITE POSITIONING RECEIVER AND PROXY LOCATION SYSTEM

(75) Inventors: Robert J. Anderson, Phoenixville, PA (US); Matthew L. Ward, Collegeville, PA (US)

(73) Assignee: TruePosition, Inc., Berwyn, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/439,287

(22) Filed: Apr. 4, 2012

(65) Prior Publication Data

US 2012/0194382 A1 Aug. 2, 2012

Related U.S. Application Data

(63) Continuation of application No. 12/641,807, filed on Dec. 18, 2009, now Pat. No. 8,199,051.

(51) Int. Cl.
*G01S 19/46* (2010.01)
*G01S 19/34* (2010.01)
*G01S 19/48* (2010.01)

(52) U.S. Cl.
CPC .............. *G01S 19/46* (2013.01); *G01S 19/34* (2013.01); *G01S 19/48* (2013.01)

(58) Field of Classification Search
CPC ..... G01S 19/421; G01S 19/426; G01S 19/42; G01S 19/34; G01S 19/46; G01S 19/49

USPC ............ 342/357.25, 357.29, 357.31, 357.74; 455/343.1–343.2, 456.1

See application file for complete search history.

(56) References Cited

U.S. PATENT DOCUMENTS

| | | | |
|---|---|---|---|
| 6,327,535 B1 * | 12/2001 | Evans et al. | .................... 701/300 |
| 6,366,571 B1 | 4/2002 | Fiut et al. | |
| 6,973,337 B2 | 12/2005 | Jiguet et al. | |
| 7,072,316 B2 | 7/2006 | Proctor, Jr. et al. | |
| 7,414,988 B2 | 8/2008 | Jones et al. | |
| 7,477,906 B2 | 1/2009 | Radic et al. | |
| 7,595,754 B2 | 9/2009 | Mehta | |
| 2002/0098851 A1 | 7/2002 | Walczak et al. | |
| 2004/0029558 A1 | 2/2004 | Liu | |
| 2004/0104841 A1 * | 6/2004 | Syrjarinne | ................ 342/357.13 |

(Continued)

FOREIGN PATENT DOCUMENTS

| | | |
|---|---|---|
| JP | 2002-228739 A | 8/2002 |
| JP | 2009-031041 A | 2/2009 |
| WO | WO 2009/149417 A1 | 12/2009 |

OTHER PUBLICATIONS

Proxy. (2000). In Collins english dictionary. Retrieved from http://search.credoreference.com/content/entry/hcengdict/proxy/0.*

(Continued)

*Primary Examiner* — Tashiana Adams
*Assistant Examiner* — Fred H Mull
(74) *Attorney, Agent, or Firm* — Baker & Hostetler LLP

(57) ABSTRACT

To reduce power consumption in a user terminal, especially mobile devices, a system and method are introduced that use terrestrial beacons as a location proxy when satellite positioning signals are not available. The geographic locations of the terrestrial beacons need not be known to use the beacons as a proxy for a satellite positioning signals derived location.

46 Claims, 7 Drawing Sheets

(56) References Cited

U.S. PATENT DOCUMENTS

| | | | |
|---|---|---|---|
| 2005/0124294 | A1 | 6/2005 | Wentink |
| 2006/0125694 | A1* | 6/2006 | Dejanovic et al. ............ 342/463 |
| 2006/0202818 | A1 | 9/2006 | Greenberg |
| 2006/0290499 | A1* | 12/2006 | Chang .................. G01S 5/0263 340/572.1 |
| 2007/0275734 | A1* | 11/2007 | Gaal et al. ................. 455/456.6 |
| 2008/0001733 | A1 | 1/2008 | Pinder |
| 2008/0004036 | A1* | 1/2008 | Bhuta et al. ................ 455/456.1 |
| 2008/0108371 | A1* | 5/2008 | Alizadeh-Shabdiz et al. .......................... 455/456.1 |
| 2008/0167896 | A1 | 7/2008 | Fast et al. |
| 2008/0261627 | A1 | 10/2008 | Manson et al. |
| 2009/0192709 | A1 | 7/2009 | Yonker et al. |
| 2009/0312034 | A1 | 12/2009 | Burroughs et al. |
| 2011/0201274 | A1* | 8/2011 | Freathy et al. ............... 455/41.2 |
| 2012/0112961 | A1* | 5/2012 | Sengupta et al. ........ 342/357.31 |

OTHER PUBLICATIONS

Proxy. (2001). In Chambers 21st century dictionary. Retrieved from http://search.credoreference.com/content/entry/chambdict/proxy/0.*

Proxy. (2007). In the Penguin English dictionary. Retrieved from http://search.credoreference.com/content/entry/penguineng/proxy/0.*

Proxy. (2011). In the american heritage(R) dictionary of the english language. Retrieved from http://search.credoreference.com/content/entry/hmdictenglang/proxy/0.*

J.-S. Lee et al., A Comparative Study of Wireless Protocols: Bluetooth, UWB, ZigBee, and Wi-Fi, 33rd Annual Conference of the IEEE Industrial Electronics Society, p. 46-51, Nov. 2007.*

SDR Forum: Software Defined Radio Commercial Handset Guidelines, SDRF-04-A-0006-V0.00, Aug. 2004.*

"Broadband Upgrades Its Industry Leading Hosted Location Based Services and Network to Provide Advanced Wi-Fi® Positioning Services with Skyhook Wirless," Sep. 30, 2008, 4 pages, http://www.broadcom.com/press/rleast.php?id=1203677&industry_id=2#.

Graham, pp., J., "Jobs, iPhone have Skyhook pointed in right direction," USA Today, 2009, 2 pages, http://www.usatoday.com/tech/products/2008-01-22-skyhook_N.htm.

Happich, J., "1.5 Billion WiFi Chipsets to Ship in 2014, says analyst," EE Times, Dec. 7, 2009, 1 page, http://www.eetimes.com/showArticle.jhtml?articleID=222000803.

"Polaris Wireless Integrates Wi-Fi into Location Based Platform," Cellular-News, posted Jan. 13, 2010, 1 page, www.cellular-news.com/story/41426.php.

* cited by examiner

SATELLITE POSITIONING RECEIVER AND PROXY LOCATION SYSTEM

CROSS-REFERENCE

This application is a continuation of U.S. application Ser. No. 12/641,807, filed Dec. 18, 2009, currently pending, which is hereby incorporated by reference in its entirety.

TECHNICAL FIELD

The present invention relates to a method and apparatus for satellite positioning systems generally and, more particularly, but not exclusively, to a multi-receiver approach to allow location in-building or whenever or wherever sufficient satellite positioning signals are not available.

BACKGROUND

Positioning systems, such as Global Navigation Satellite Systems (GNSS) (the current operational example is the US NavStar GPS system) receivers, are increasingly being integrated into battery-operated terminals (i.e., netbook personal computers and mobile wireless devices). The orbiting satellite constellations provide low-power, wideband radio signals that the receiver uses to estimate the location of the user terminal. These location estimates are typically provided to on-board applications running on a co-located processing unit. To maximize the duration between battery recharge, fuel cell fill-up, or replacement of the power source, power consumption by the location receiver subsystem should be limited. Currently location receiver subsystems are only powered when actively required by a location-based application and even then are periodically powered down resulting in an periodic but intermittent set of location estimates.

A variety of terrestrial digital radio beacons with known signal characteristics (transmission frequency, frequency band, demodulation, framing, framing rate, bit patterns) and broadcast identifiers are available in the form of wireless local area networks (WLAN) and wide area cellular communications networks Wireless Communications Networks (WCNs) are deployed to allow users to access said networks.

SUMMARY

The present invention concerns a method and apparatus to reduce power consumption in a user terminal, especially mobile devices, by using terrestrial beacons as a location proxy when satellite positioning signals are not available. The geographic location of the terrestrial beacons need not be known to use the beacon as a proxy for a satellite positioning signals derived location.

For example, in an illustrative embodiment, a mobile device comprises a GNSS receiver configured to receive GNSS signals; a second receiver configured to receive a terrestrial beacon signal; and a controller. In the illustrative embodiment, the controller is configured to detect when GNSS signals are unavailable due to signal blockage and, in response thereto, to use a received terrestrial beacon signal to determine whether a previous GNSS location update is valid. Other aspects of the disclosed subject matter are described in detail below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
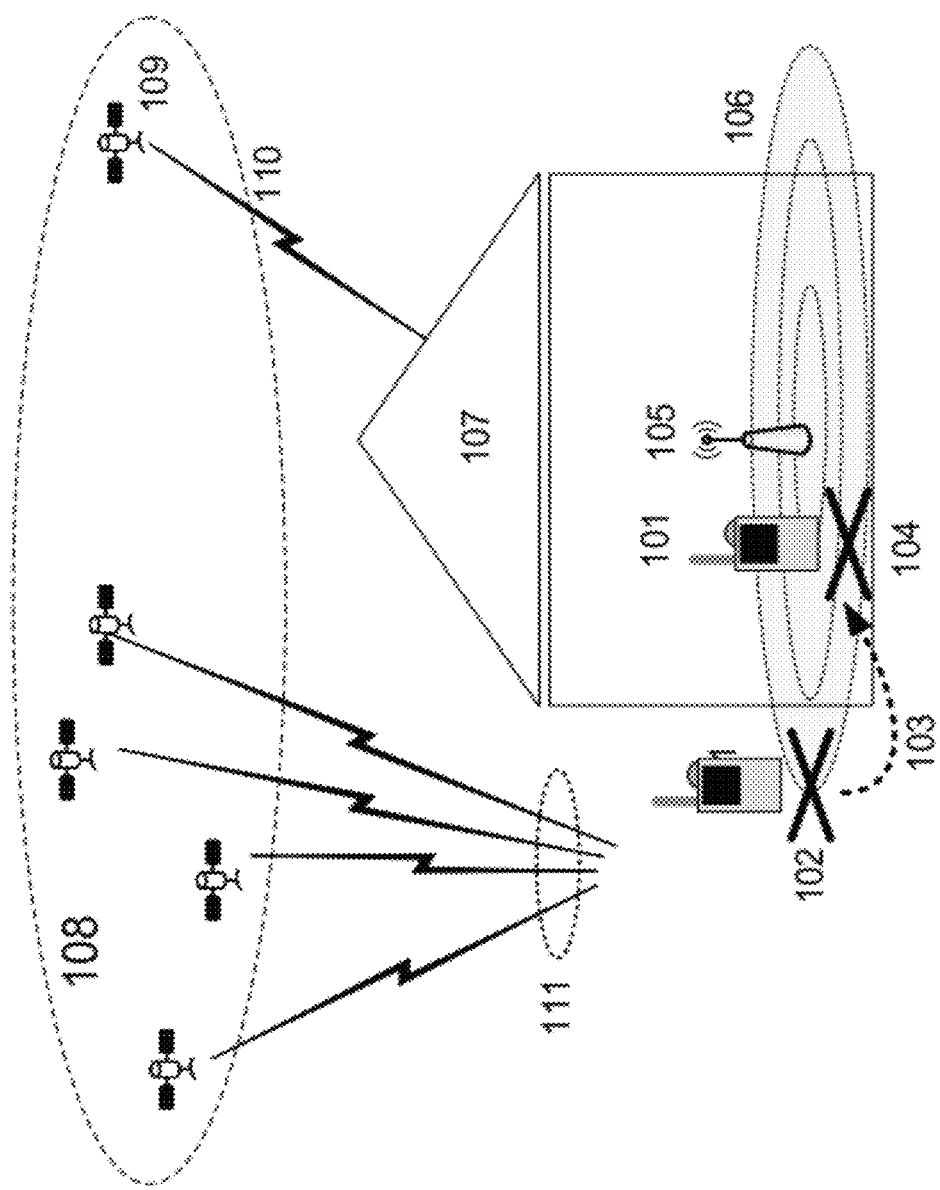
FIG. 1 illustrates the use of a local terrestrial beacon as a proxy replacement for satellite signaling.

We will now describe illustrative embodiments of the present invention. First, we provide a detailed overview of the problem and then a more detailed description of our solutions.

The Self-positioning receiver (also known as a Location Device Platform (LDP)) is a multi-receiver device used to create and deliver location estimation on a periodic or ad hoc basis to a location application. The LDP is assumed to be battery powered and thus have a limited useful life, so techniques to limit power consumption are vital to the duration of service provided. The LDP circuitry is designed to be part of a greater device such as a mobile phone, personal or auto navigation system, or location-aware tag. The device need not have transmission facilities since the proxy technique does not require duplex communications with a wireless network.

When GNSS signals are unavailable due to signal blockage, as determined by a failed GNSS location update, the LDP can use its secondary receiver(s) received network parameters such as beacon power, beacon identifiers, and/or signal timing advance or round-trip-time, to determine if the last known GNSS derived position is still valid. By suspending the GNSS searches for an interval or until a specific event is met, the GNSS related circuitry and processing can be powered completely down, extending battery life.

A. The LDP

Multi-Receiver Devices

The LDP is a multi-receiver device. The GNSS receiver is nominally used for location estimation. A proxy receiver (which may be part of a transceiver) is used for collection of signal information from a terrestrial beacon. A Software Defined Radio (SDR) can be used to emulate the multiple receivers and sample the GNSS and terrestrial networks. For increased performance, more than 2 receivers can be used in parallel to allow concurrent GNSS and multiple terrestrial beacon sampling.

Beacons

Beacons are radio transmitters using established frequencies or frequency bands that transmit data which includes identifying information according to a pre-established scheme. Use of digital data broadcasts by a beacon allows for identification of the beacon and its network. The network timing is developed from the frames transmitted by the beacon (the pilot channel or synchronization channel). Examples of beacon transmissions include the Broadcast Control Channel of cellular networks and the Beacon Frame of an IEEE 802.11 network, and examples of beacon identifiers include the Cell-ID in CDMA and UMTS cellular networks, the Cell-Global-Identifier (CGI) in GSM cellular networks, Base Station Identifier (BSSID) in IEEE 802.11 wireless local area networks.

Passive Beacon Power Levels and Proximity

The LDP can passively use a beacon as a proxy for a high accuracy GNSS location estimate by measuring the signal strength of neighboring beacons during the periodic sampling event. Since both the GNSS receiver and the terrestrial beacon receiver collect information concurrently, a measurement of the proxy beacon's transmit power can be taken and compared to the beacon's transmit power recorded at the last GNSS location fix. A set of thresholds set using the recorded beacon power is established by the LDP so that motion toward or away from the proxy beacon can be detected on subsequent sampling periods.

FIG. 1 illustrates the use of a local terrestrial beacon (in this example, a short range Wireless local area network (WLAN) Access Point such as a WiFi (IEEE 802.11) node) as a proxy replacement for satellite signaling. In FIG. 1 the mobile device 101 is shown outside a building 107 with the GNSS satellite constellation 108 with unimpaired radio broadcasts 111 to allow determination of location. In this example, a single satellite 109 of the constellation 108 is shown with the navigation radio broadcast signal 110 blocked by the building 107. Within the building is a WLAN node 105 with broadcast signal 106 which can be detected by the mobile device 101 receiver outside the building 107.

The same mobile device 101 is shown after moving 103 into a location 104 inside the building 107. While the GNSS satellites 108 broadcast signals 111 109 are now blocked by the building, the mobile device 101 can still detect the same broadcast 109 from the WLAN node 108. The individual members of the GNSS satellite constellation 108 with broadcast signals 111 or 110 may still be detected, but less than 4 satellite broadcasts are insufficient for calculation of a GNSS-based location estimate. However, since the identifiable local broadcast signal 106 can still be detected the last GNSS developed position estimate can be considered valid as long as the proxy beacon transmission 106 can be detected.

Figure 2A:
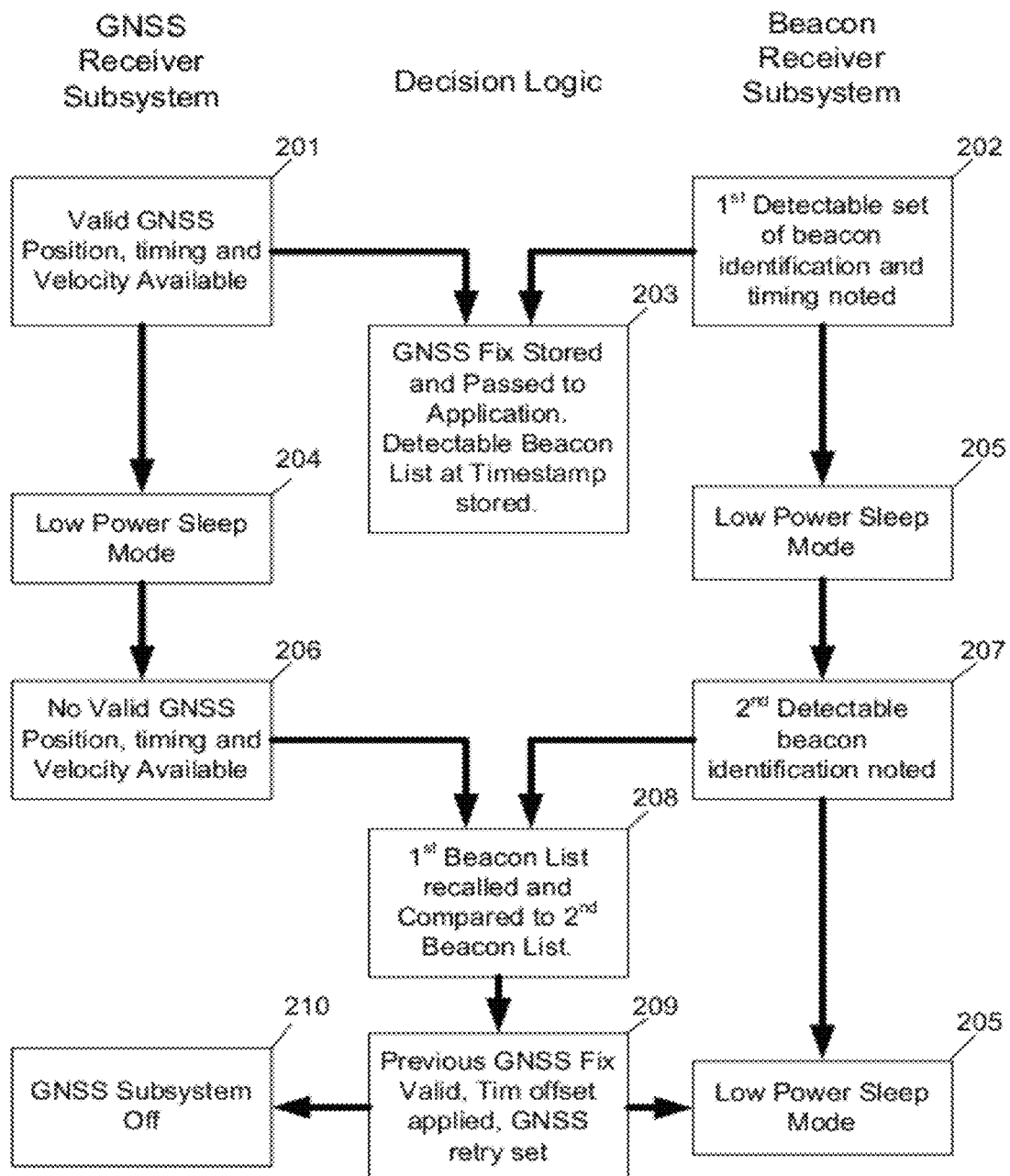
FIG. 2a depicts the events in the use of a terrestrial beacon as a proxy replacement for satellite signaling.

FIG. 2a details the operative steps in use of a terrestrial beacon as a proxy to determine the validity of the present position versus a previous GNSS acquired position.

The GNSS receiver subsystem must develop a first valid GNSS position 201. This position includes latitude, longitude, altitude, timing, and optionally velocity. Closely parallel and nearly simultaneously, the Beacon Receiver Subsystem detects and identifies radio beacons in predefined transmission bands 202. Information on the beacons includes transmitter identification and can include received power, receiver timing, or other signal quality measurements. The first GNSS position and first list of beacons are delivered to the processor subsystem and stored locally 203. Since the first GNSS position developed was valid, the GNSS developed information is passed to the location-consuming application (not shown). Once the GNSS receiver subsystem has delivered the 1$^{st}$ GNSS position, the GNSS receiver system is allowed to enter a low power sleep mode until the next required update 204. The frequency of required position updates is set by the location-consuming application via the processor subsystem. The Beacon Receiver Subsystem also is allowed to enter a low power sleep mode until the next required update 205. While the GNSS receiver subsystem is producing valid GNSS position fixes, the Beacon Receiver Subsystem is activated in parallel to the GNSS receiver subsystem.

When the GNSS receiver subsystem 206 fails to produce a valid GNSS location fix 206, in response the Beacon Receiver Subsystem simultaneously produces a current list of detectable, identifiable beacons 207. In this case, the controller compares the current beacon list to the prior beacon list associated in time with the last valid GNSS fix.

In the example case, the presence of a limited-range beacon (such as a IEEE-802.11 WiFi node) in both the current and prior beacon lists allows the controller to reuse the last valid GNSS position with an increased error radius. The error radius may be varied according the beacon type (For instance 802.11 versions "b" and "g" access points generally have a maximum range of 100 meters while "n" has an extended range to 200 meters. Other WLAN or beacon technologies such as Bluetooth, RFID, and those using ultra-wideband (UWB) have even shorter ranges in the 10's of meters) or frequency band (as the signal frequency increases, the range decreased).

If the controller determines that the last valid GNSS fix is still valid based on the examination of the beacon lists, then the controller will switch the GNSS receiver subsystem off 210 and will set triggering conditions to reactivate and retry GNSS location at a later time when those triggering conditions are met. The beacon receiver subsystem is commanded to transition to low power state 205 by the controller.

Figure 2B:
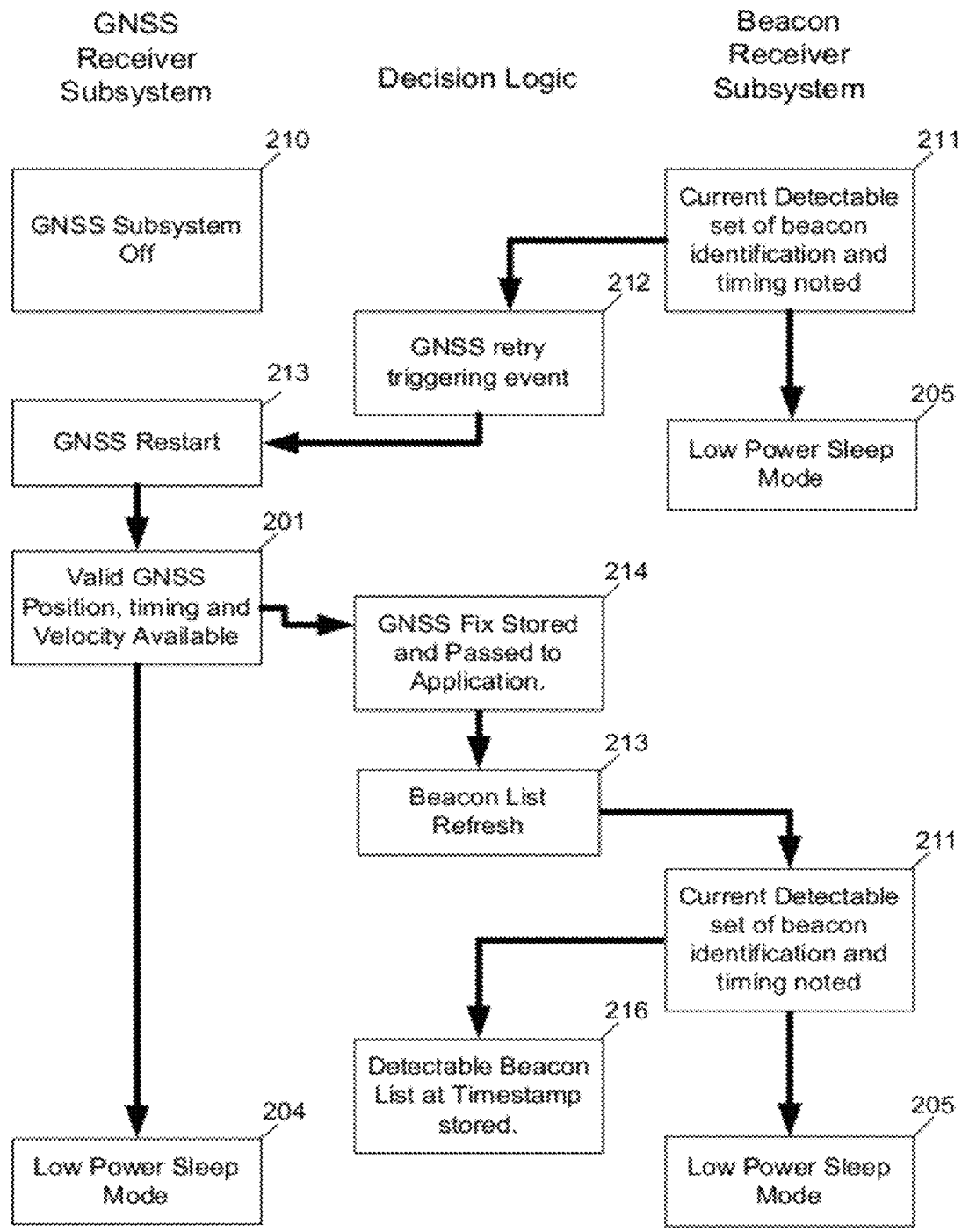
FIG. 2b depicts the events in the discontinuing use of a terrestrial beacon as a proxy replacement for satellite signaling.

FIG. 2b depicts the successful resumption of GNSS locations after a triggering event. In this scenario, the GNSS receiver subsystem starts as powered off 210. The controller detects a GNSS retry triggering event. These GNSS retry triggering events are detailed in a later section of this document. In a prime example of a GNSS retry event, as shown in FIG. 2b, the beacon receiver subsystem produces a fresh beacon list 211 which is transmitted to the controller. The controller detects that the fresh beacon list is missing the previously selected proxy beacon. Since the proxy beacon or beacons selected is no longer acceptable to assure continued location validity, a GNSS reactivation and retry is warranted 212.

The GNSS reactivation and retry 213 is nominally a hot start with the controller uploading the current time, last valid location as well as the stored Almanac and Ephemeris data to the GNSS receiver subsystem. In this example, after the hot-start, the GNSS receiver successfully performs positioning 201 and passes the GNSS generated information to the controller where it is stored and passed to the application 214. The controller commands the beacon receiver subsystem to rescan for beacons 213. The beacon receiver subsystem scans for detectable, identifiable beacons and reports the determined list to the controller before going into low power sleep mode 211. The controller stores the refreshed beacon list and timestamp 216.

Figure 2C:
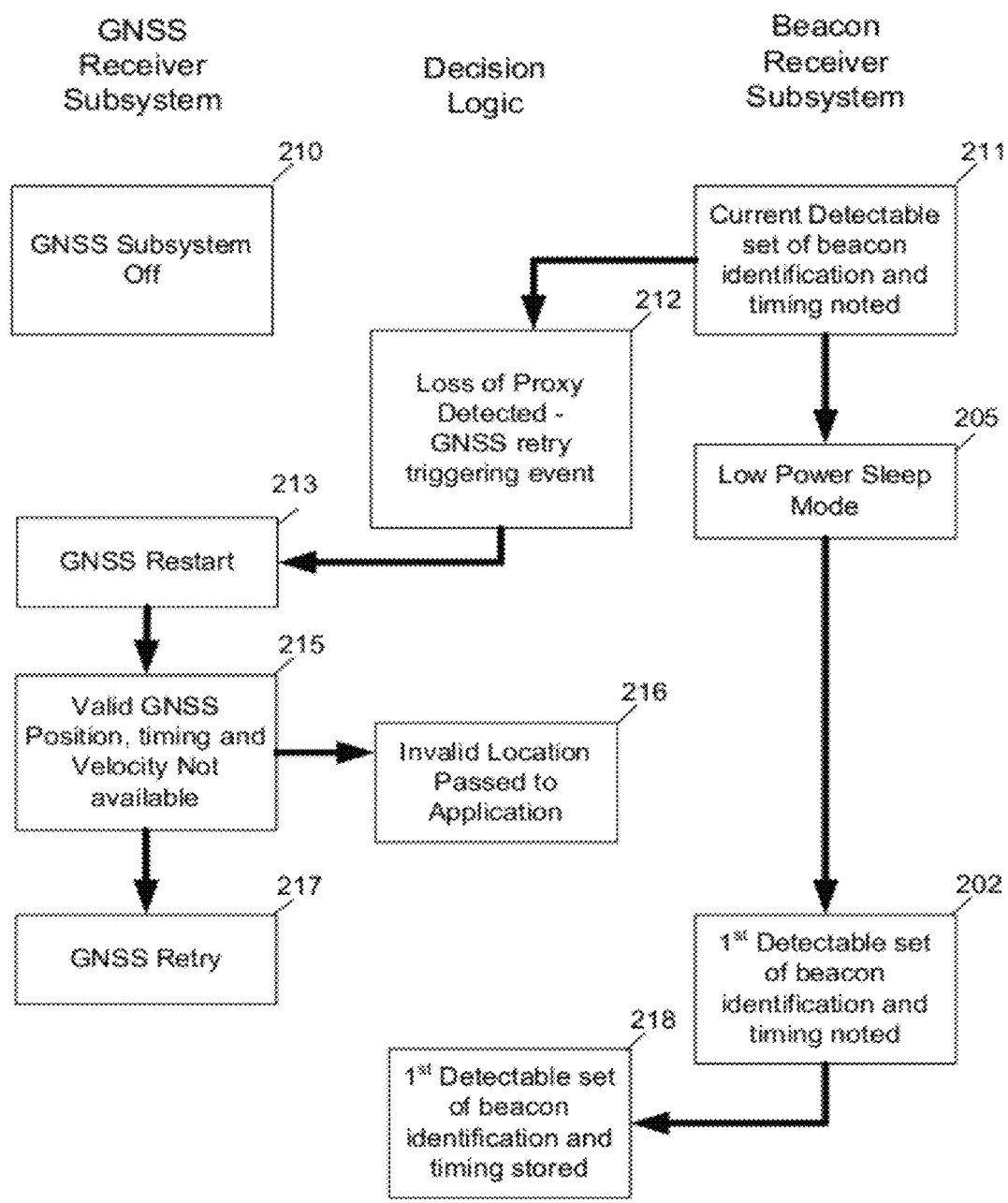
FIG. 2c depicts the events in the failure case in discontinuing use of a terrestrial beacon as a proxy replacement for satellite signaling.

FIG. 2c depicts the unsuccessful resumption of GNSS locations after a triggering event. In this scenario, the GNSS receiver subsystem starts as powered off 210. The controller detects a GNSS retry triggering event. In the example case, shown in FIG. 2c, the beacon receiver subsystem produces a fresh beacon list 211 which is transmitted to the controller. The lack of the previously determined proxy beacon in the fresh beacon list triggers the controller to retry the GNSS subsystem 212.

The GNSS reactivation and retry 213 is nominally a hot start with the controller uploading the current time, last valid location as well as the stored Almanac and Ephemeris data to the GNSS receiver subsystem. In this example, after the hot-start, the GNS receiver fails to produce a GNSS position fix 215. This failure to produce a new GNSS location is passed to the controller which then signals the application that current location is unknown or unreliable 216.

Figure 3:
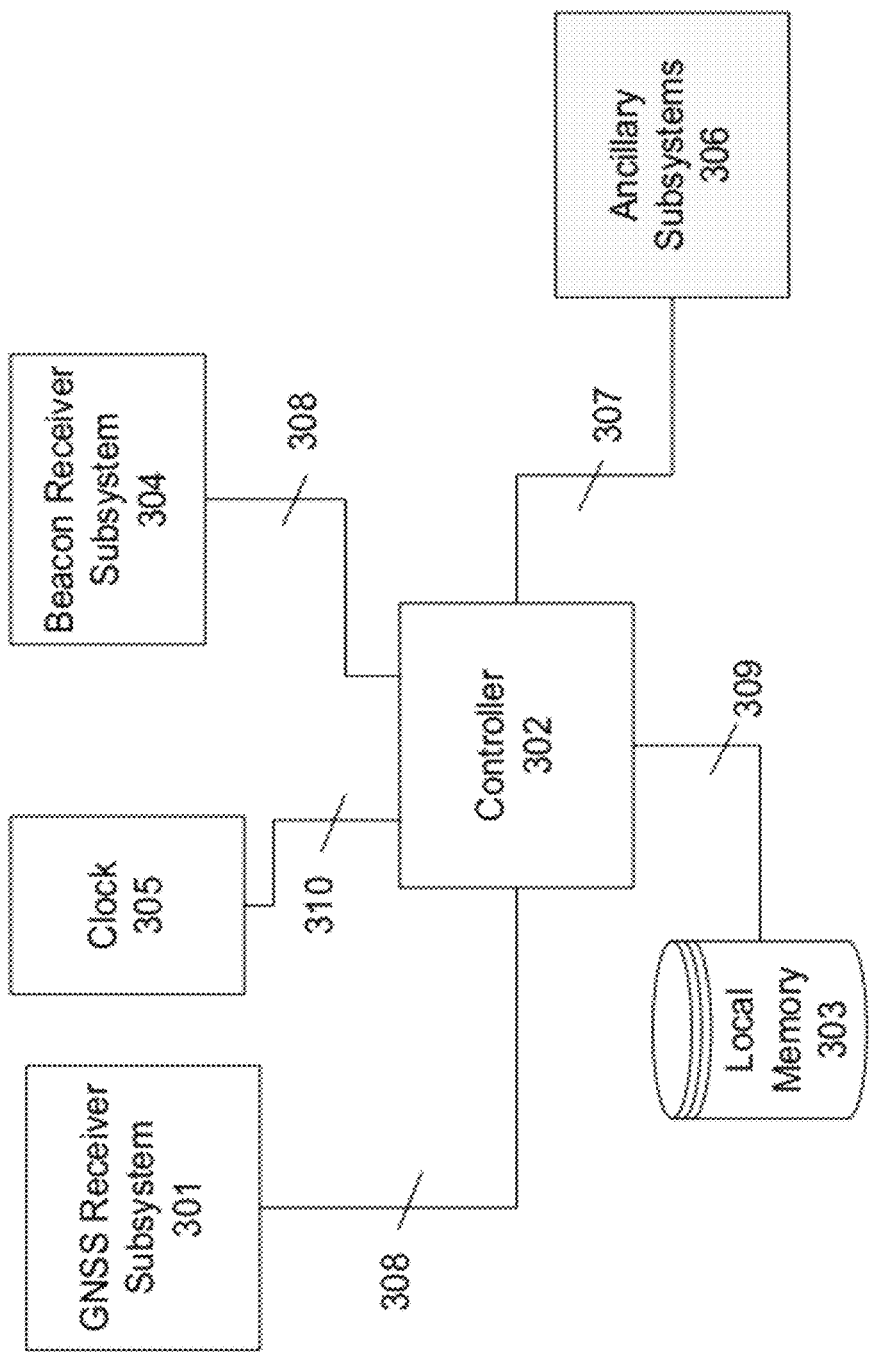
FIG. 3 depicts a multi-receiver location-capable subsystem for a mobile or portable device

FIG. 3 depicts the location device platform (LDP) functional elements. The GNSS receiver Subsystem (GRS) 301 is a low-power commercial GPS chipset connected to the microprocessor-based controller 302 via a data bus 308.

The beacon receiver subsystem (BRS) 304 is a low-power commercial WLAN or Wireless receiver connected to the microprocessor-based controller 302 via a data bus 308 such as a serial peripheral interface (SPI). Functionally, the GRS 301 and BRS 304 are distinct receivers, but may share antenna and circuitry.

The Clock 305 is a commercially available clock module. Depending on the designer's selection of triggering events, the unit cost, and power consumption, the clock can range from a highly stable clock such as a Temperature Compensated Crystal Oscillator to a less stable but inexpensive quartz crystal based real time clock. The Clock 305 will be set and disciplined by the controller using the GNSS derived timing signal from the GRS 301 when available. The Clock 305 may also be used to determine low power sleep periods for the GRS 301, the BRS 304 and the controller 302. If the clock module 305 has been so selected, it would be possible to provide a reference GNSS system time to the GRS 301 allowing a faster time-to-fix.

The controller 302 is a low-power commercial microprocessor which handles data transfers between subsystems as well as providing a computation platform to the decision logic of the LDP. The controller 302 may be alternately be implemented as a software program running on a processor supplied as part of the ancillary subsystem 306.

The local memory 303 is used to store Almanac and Ephemeris data from the GRS 301 as well as beacon information determined by the BRS 304.

The ancillary Subsystems 306 are included to represent the greater device of which the LDP is a part. The Ancillary Subsystems 306 can include microprocessors, volatile and non-volatile memory, software applications, a battery monitor, displays and inputs that use or manipulate the supplied location information.

Broadcasts from Wide Area Communications Networks such as Cellular phone systems are well suited to serve as proxy beacons. Very small base stations (Femto-cells) resemble WLAN nodes in the range and power. Larger, wider area base stations transmit at high power to allow service in buildings. Cellular broadcasts are standardized, in specific bands, using specific bandwidths and modulations. Cellular broadcasts contain identifiers (Cell Global Identity (GSM), Cell Identity (UMTS) and BaseID (CDMA2000)) allowing for discrimination of transmissions from cells or sectors of a cell. Use of relative power and relative time difference of arrival techniques allow for detection of movement or changes in position without need for knowledge of the cellular transmitter's location or power.

Figure 4:
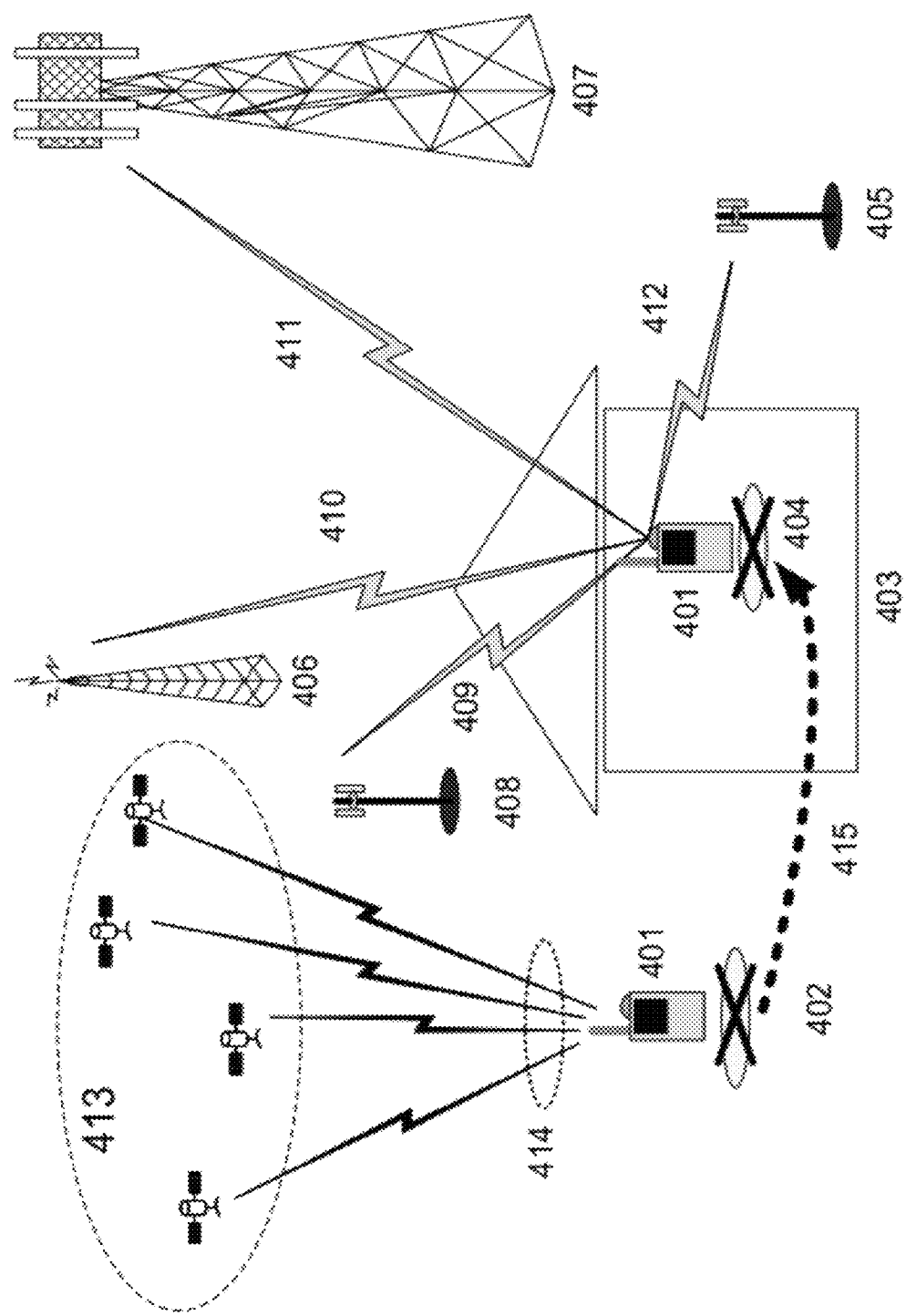
FIG. 4 illustrates the use of timing from a terrestrial wireless communications system as a proxy replacement for satellite signaling

FIG. 4 depicts the use of beacon signals provided by a wide area cellular network as a proxy for a GNSS developed location estimate. The mobile device 401 is first located at a point 402 outside the building 403. The broadcast radio signals 414 from the GNSS constellation 413 can be successfully used at the first point 402 to generate a valid location, velocity, altitude and time-of-day estimate. Broadcast signals from the cellular system 405 406 407 408 are also available at the first point 402. At some time, the mobile device 401 moves 415 into the building 403 to the second point 404. The broadcast signals 414 from the GNSS constellation 413 are now blocked by the surrounding structure 403. The high power broadcast signals 409 410 411 412 from the cellular network 405 406 407 408 can successfully penetrate the building allowing the mobile device 401 to use the broadcast signals 409 410 411 412 as a proxy.

The proxy in this example is dependent on the relative time differences between broadcast signals 409 410 411 412. Since the locations of the cellular network transmitters are not known, a location cannot be calculated from the relative timing differences, but the relative timing differences between those received at the first position 402 and the second position 404 can be used to determine the approximate change in position and therefore if the valid GNSS position fix can still be considered valid.

Figure 5:
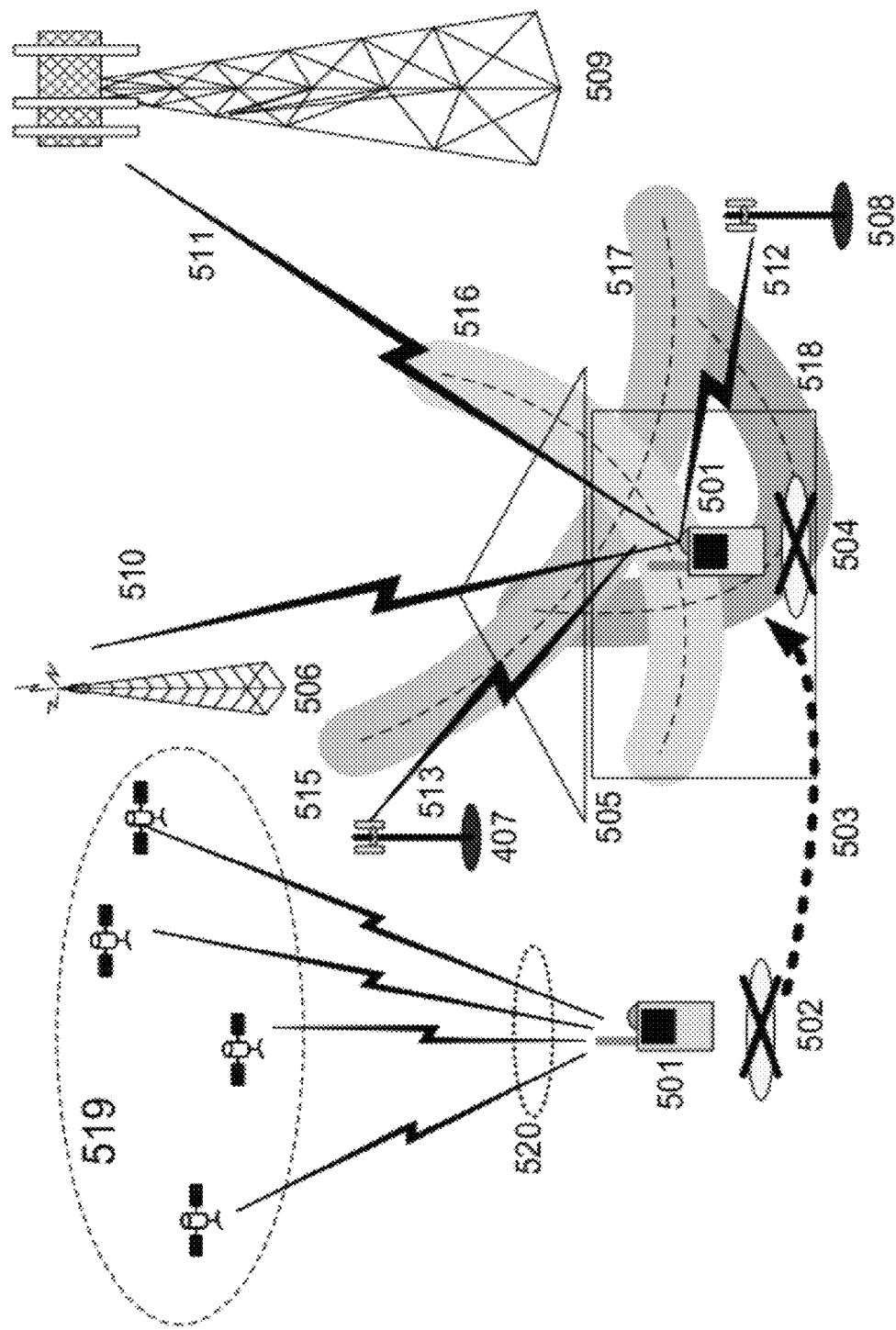
FIG. 5 illustrates the use of received power from a terrestrial wireless communications system as a proxy replacement for satellite signaling

FIG. 5 depict the use of beacon signals provided by a wire area cellular network as a proxy for a GNSS developed location estimate. The mobile device 501 is first located at a point 502 outside the building 505. The broadcast radio signals 520 from the GNSS constellation 519 can be successfully used at the first point 502 to generate a valid location, velocity, altitude and time-of-day estimate. Broadcast signals from the cellular system 506 507 508 509 are also available at the first point 502. At some time, the mobile device 501 moves 503 into the building 505 to the second point 504. The broadcast signals 515 from the GNSS constellation 514 are now blocked by the surrounding structure 505. The higher power broadcast signals 510 511 512 513 from the cellular network 506 507 508 4509 can successfully penetrate the building allowing the mobile device 401 to use the broadcast signals 510 511 512 513 as a proxy.

The proxy in this example is dependent on the relative power differences between broadcast signals 510 511 512 513. Since the location and transmission power of the cellular network transmitters are not known, a location cannot be calculated from the power differences, but the relative power differences between those received at the first position 502 and the second position 504 can be used to determine the approximate change in position and therefore if the valid GNSS position fix from the first position 502 can still be considered valid. These relative power differences are shown as the series of hyperbolas 515 516 517 518.

B. GNSS Retry Triggering Events

Loss of Proxy Beacon Trigger

Using the broadcast signal as a proxy for the last known valid GNSS position, if the proxy can no longer be detected, a GNSS retry is initiated.

Impending Loss of Hot Start Trigger

The GNSS receiver (in this example, a GPS receiver) collects Almanac and Ephemeris data from the satellite broadcasts. The GPS Almanac contains the orbital parameters for all active GPS satellites and is broadcast by all satellites. The need for precise GPS Almanac data is not stringent, so GPS Almanac data can be considered valid for a several month period.

The Ephemeris data, the very precise orbital and clock correction broadcast by each GPS satellite every 30 seconds, is normally collected from each individual satellite broadcast. Ephemeris data is time sensitive and must be refreshed at frequent intervals (for example of less than 30 minutes) or accurate location estimation will be precluded.

To prevent a 'cold start' condition, where the GNSS receiver must collect fresh Almanac and Ephemeris or a 'warm start' where the GNSS receiver must collect fresh Ephemeris data before calculating a location estimation, the LDP will periodically activate the GNSS receiver subsystem to attempt a new GNSS location estimate.

Satellite Freshness Trigger

When Ephemeris data is collected from each available satellite, a timestamp is applied. A database entry of time, satellite ID, and Ephemeris data is created within the LDP. As the Ephemeris data ages past the limit (nominally 30 minutes), data for that satellite is marked stale. The trigger for a new GNSS location is set to attempt a satellite signal collection and location estimation before a database entry is marked stale. This triggering method relies on a scheme where after initial cold-start, satellite ephemeris data is collected by the GNSS receiver only for newly available satellites or when a guard time (nominally 15 minutes) for reach database entry is exceeded.

Predictive models of satellite availability over time, based on the Almanac data may also be used to invalidate a database ephemeris entry as the satellite moves over the horizon. This predicted behavior can trigger a location before the satellite is predicted to unavailable.

One-Shot Timer Exceeded Trigger

The GNSS proxy location validity technique can support an arbitrary validity timer. Even if the proxy has not been lost, a GNSS positioning retry will be attempted. This is a resettable timer.

Progressive GPS Retry (Timed) Trigger

The GNSS proxy location validity technique can support an arbitrary or hot-start validity timer. Even if the proxy has not been lost, a GNSS positioning retry will be attempted. On each failure, the interval between retries will be reduced.

Drift Trigger

A GNSS retry can be required if the proxy beacon power changes over threshold (up/down) or due to changes in the received relative beacons power or signal timing.

Neighbors Trigger

A GNSS retry can be required if the proxy beacon list changes. This technique is especially useful in the use of a WLAN node as a proxy beacon.

Last Gasp Trigger

A GNSS retry can be required if the device battery monitor signals that power is running low. This trigger is especially useful in location-aware tags with persistent, non-volatile memory.

C. Alternative Embodiment—LDP Devices with Communications Transceivers

Registration Retries

When the LDP is equipped with a Wireless Communications Transceiver in place of the Beacon receiver subsystem, the proxy technique for determination of extended GNSS validity can be performed using Wireless Communications Network (WCN) information other than the Beacon identity, timing and received power. Specifically, data such as received signal strength (RSS), Timing Advance (TA), Round-Trip-Time (RTT) or Round-Trip-Delay (RTD) become available to the LDP with registered with the WCN. Since the LDP is not a conforming cellular device, the LDP can retry connecting with cellular network to gather timing and signal data from multiple beacons.

Active Determination of Beacon Timing

Since the LDP with a Wireless Communications Transceiver has the ability to create an active session with the Wireless Communications Network (WCN). The active session need not create a data path through the WCN, requiring the LDP to have a subscription to the WCN provided service and a home server with which to correspond. Rather, the LDP can use a failed session initiation to receive information from the WCN not available on the broadcast beacon.

This additional information can include the timing advance (TA) as estimated from the round trip time or the round trip time (RTT) itself, a received signal strength indicator (RSSI), details on the frequencies or identifiers of neighboring beacons. While the timing and signal power information can be used directly to determine motion, use of the neighboring beacon information can be used to retune the LDP proxy receiver to develop timing and/or power measurements for each of the beacons. The added timing and power information would also be used to detect motion which would invalidate the last GNSS obtained position.

D. Conclusion

The true scope the present invention is not limited to the presently preferred embodiments disclosed herein. In many cases, the place of implementation (i.e., the functional element) described herein is merely a designer's preference and not a hard requirement. In addition, modifications and variations of the illustrative embodiments described above may be apparent to those skilled in the art after reading this specification. Accordingly, except as they may be expressly so limited, the scope of protection of the following claims is not intended to be limited to the specific embodiments described above.

We claim:

1. A mobile device, comprising:
 a first receiver, comprising a global navigation satellite system (GNSS) receiver configured to receive GNSS signals and to provide updates of GNSS location measurements over time;
 a second receiver configured to receive a terrestrial beacon signal; and
 a controller operatively coupled to the GNSS receiver and the second receiver;
 wherein the mobile device is configured to detect when GNSS signals are unavailable and, in response thereto, to use a received terrestrial beacon signal to determine whether a previous GNSS location measurement is valid, wherein the mobile device is configured to use the beacon as a proxy for a location derived from satellite positioning signals without knowing the geographic location of the terrestrial beacon;
 wherein the mobile device is further configured to perform the following steps:
  employing the GNSS receiver to develop a first valid GNSS location including latitude, longitude, altitude, and timing;
  in parallel, employing the second receiver to detect and identify one or more radio beacons in predefined transmission bands;
  storing the first valid GNSS location and a first list of beacons locally within the mobile device;
  entering the GNSS receiver into a low power sleep mode;
  upon determining that the GNSS receiver has failed to produce a valid current GNSS location fix, using the second receiver to produce a current beacon list of detectable, identifiable beacons;

comparing the current beacon list to a prior beacon list associated in time with a last valid GNSS location update; and upon determining the presence of a limited-range beacon in both the current and prior beacon lists, reusing a previously obtained valid GNSS location as the current location of the device, and determining an error radius based on the type of limited-range beacon in both the current and prior beacon lists; and wherein the mobile device is further configured to passively use received beacon signals from multiple beacons as a proxy for a high accuracy GNSS location estimate by measuring and comparing the strengths of signals received from neighboring beacons during periodic sampling events.

2. A mobile device as recited in claim 1, wherein the controller is further configured to suspend GNSS searches and to power down the GNSS receiver in response to detecting that GNSS signals are unavailable.

3. A mobile device as recited in claim 1, wherein the mobile device is integrated into a mobile phone.

4. A mobile device as recited in claim 1, wherein the mobile device is integrated into a personal or automobile navigation system.

5. A mobile device as recited in claim 1, wherein the mobile device is integrated into a tag device.

6. A mobile device as recited in claim 1, wherein the mobile device is battery powered.

7. A mobile device as recited in claim 1, wherein the GNSS receiver and second receiver are implemented in a software defined radio (SDR).

8. A mobile device as recited in claim 1, wherein the mobile device is further configured to determine network timing from frames transmitted by the beacon.

9. A mobile device as recited in claim 8, wherein the mobile device is further configured to receive at least one of a pilot channel signal and a synchronization channel signal from the beacon.

10. A mobile device as recited in claim 8, wherein the mobile device is further configured to receive beacon transmissions including at least one of a broadcast control channel of a cellular network and a beacon frame of an IEEE 802.11 network.

11. A mobile device as recited in claim 8, wherein the mobile device is further configured to receive beacon identifiers including at least one of a cell-ID in a CDMA or UMTS cellular network, a cell-global-identifier (CGI) in a GSM cellular network, and a base station identifier in an IEEE 802.11 wireless local area network.

12. A mobile device as recited in claim 1, wherein the mobile device is further configured to perform a process including the following steps, whereby the device resumes GNSS locations after a triggering event:

a GNSS retry triggering event is detected;

the controller uploads the current time, last valid location, and stored almanac and ephemeris data to the GNSS receiver;

the GNSS receiver successfully performs positioning and GNSS generated information is stored and passed to a location-consuming application;

the second receiver scans for detectable, identifiable beacons and reports a list to the controller and then goes into the low power sleep mode; and the refreshed beacon list and a timestamp are stored.

13. A mobile device, comprising:

a first receiver, comprising a global navigation satellite system (GNSS) receiver configured to receive GNSS signals and to provide updates of GNSS location measurements over time;

a second receiver configured to receive a terrestrial beacon signal; and a controller operatively coupled to the GNSS receiver and the second receiver;

wherein the mobile device is configured to detect when GNSS signals are unavailable and, in response thereto, to use a received terrestrial beacon signal to determine whether a previous GNSS location measurement is valid, wherein the mobile device is configured to use the beacon as a proxy for a location derived from satellite positioning signals without knowing the geographic location of the terrestrial beacon;

wherein the mobile device is further configured to perform the following steps:

employing the GNSS receiver to develop a first valid GNSS location including latitude, longitude, altitude, and timing;

in parallel, employing the second receiver to detect and identify one or more radio beacons in predefined transmission bands;

storing the first valid GNSS location and a first list of beacons locally within the mobile device;

entering the GNSS receiver into a low power sleep mode;

upon determining that the GNSS receiver has failed to produce a valid current GNSS location fix, using the second receiver to produce a current beacon list of detectable, identifiable beacons;

comparing the current beacon list to a prior beacon list associated in time with a last valid GNSS location update; and upon determining the presence of a limited-range beacon in both the current and prior beacon lists, reusing a previously obtained valid GNSS location as the current location of the device, and determining an error radius based on the type of limited-range beacon in both the current and prior beacon lists; and wherein the mobile device is further configured to use both the GNSS receiver and the second receiver to collect information from each receiver concurrently, and to make a measurement of the beacon's transmit power and to compare the measurement to the beacon's transmit power recorded at a previous GNSS location fix, and based on the comparison to detect motion toward or away from the beacon.

14. A mobile device as recited in claim 1, wherein the second receiver is implemented in a communications transceiver.

15. A mobile device as recited in claim 14, wherein the mobile device is configured to employ the communications transceiver to retry connecting with a cellular network to gather timing and signal data from multiple beacons.

16. A mobile device as recited in claim 14, wherein the mobile device is configured to employ the communications transceiver to create an active session with a cellular network and to use a failed session initiation to receive additional information from the network that is unavailable on a broadcast beacon.

17. A mobile device as recited in claim 16, wherein the additional information comprises at least one of timing advance (TA), a received signal strength indicator (RSSI), and details on frequencies or identifiers of neighboring beacons.

18. A method for use in determining the location of a mobile device, comprising:
  employing a first receiver, comprising a global navigation satellite system (GNSS) receiver associated with the mobile device, to receive GNSS signals;
  employing a second receiver associated with the mobile device to receive a terrestrial beacon signal; and
  employing a controller associated with the mobile device to detect when GNSS signals are unavailable and, in response thereto, to use a received terrestrial beacon signal to determine whether a previous GNSS location update is valid, wherein the mobile device is able to use the beacon as a proxy for a location derived from satellite positioning signals without knowing the geographic location of the terrestrial beacon;
  wherein the second receiver is employed to acquire network parameters from the terrestrial beacon, said network parameters including at least one of timing advance and round-trip-time; and
  wherein the method further comprises performing the following steps:
    the GNSS receiver is employed to develop a first valid GNSS location including latitude, longitude, altitude, and timing;
    in parallel, the second receiver is employed to detect and identify one or more radio beacons in predefined transmission bands;
    the first valid GNSS location and a first list of beacons are stored locally within the mobile device;
    the GNSS receiver enters a low power sleep mode until a next required update time;
    the second receiver enters a low power sleep mode until the next required update time;
    upon determining that the GNSS receiver has failed to produce a valid current GNSS location fix, the second receiver produces a current beacon list of detectable, identifiable beacons;
    the current beacon list is compared to a prior beacon list associated in time with the last valid GNSS location update; and
    upon determining the presence of a limited-range beacon in both the current and prior beacon lists, the mobile device reuses a previously obtained valid GNSS location;
  wherein the geographic location of the terrestrial beacon need not be known to use the beacon as a proxy for a location derived from satellite positioning signals; and
  wherein the method further comprises passively using received beacon signals from multiple beacons as a proxy for a high accuracy GNSS location estimate by measuring and comparing the strengths of signals received from neighboring beacons during periodic sampling events.

19. A method as recited in claim 18, further comprising suspending GNSS searches and powering down the GNSS receiver in response to detecting that GNSS signals are unavailable.

20. A method as recited in claim 18, wherein the mobile device is integrated into a mobile phone.

21. A method as recited in claim 18, wherein the mobile device is integrated into a personal or automobile navigation system.

22. A method as recited in claim 18, wherein the mobile device is integrated into a tag device.

23. A method as recited in claim 18, wherein the mobile device is battery powered.

24. A method as recited in claim 18, wherein the GNSS receiver and second receiver are implemented in a software defined radio (SDR).

25. A method as recited in claim 18, wherein the method further comprises determining network timing from frames transmitted by the beacon.

26. A method as recited in claim 25, wherein the method further comprises receiving at least one of a pilot channel signal and a synchronization channel signal from the beacon.

27. A method as recited in claim 25, wherein the method further comprises receiving beacon transmissions including at least one of a broadcast control channel of a cellular network and a beacon frame of an IEEE 802.11 network.

28. A method as recited in claim 25, wherein the method further comprises receiving beacon identifiers including at least one of a cell-ID in a CDMA or UMTS cellular network, a cell-global-identifier (CGI) in a GSM cellular network, and a base station identifier in an IEEE 802.11 wireless local area network.

29. A method as recited in claim 18, wherein the method further comprises performing a process including the following steps, whereby the device resumes GNSS locations after a triggering event:
  a GNSS retry triggering event is detected;
  the controller uploads the current time, last valid location, and stored almanac and ephemeris data to the GNSS receiver;
  the GNSS receiver successfully performs positioning and GNSS generated information is stored and passed to a location-consuming application;
  the second receiver scans for detectable, identifiable beacons and reports a list to the controller and then goes into the low power sleep mode; and
  the refreshed beacon list and a timestamp are stored.

30. A method for use in determining the location of a mobile device, comprising:
  employing a first receiver, comprising a global navigation satellite system (GNSS) receiver associated with the mobile device, to receive GNSS signals;
  employing a second receiver associated with the mobile device to receive a terrestrial beacon signal; and
  employing a controller associated with the mobile device to detect when GNSS signals are unavailable and, in response thereto, to use a received terrestrial beacon signal to determine whether a previous GNSS location update is valid, wherein the mobile device is able to use the beacon as a proxy for a location derived from satellite positioning signals without knowing the geographic location of the terrestrial beacon;
  wherein the second receiver is employed to acquire network parameters from the terrestrial beacon, said network parameters including at least one of timing advance and round-trip-time; and
  wherein the method further comprises performing the following steps:
    the GNSS receiver is employed to develop a first valid GNSS location including latitude, longitude, altitude, and timing;
    in parallel, the second receiver is employed to detect and identify one or more radio beacons in predefined transmission bands;
    the first valid GNSS location and a first list of beacons are stored locally within the mobile device;
    the GNSS receiver enters a low power sleep mode until a next required update time;

the second receiver enters a low power sleep mode until the next required update time;

upon determining that the GNSS receiver has failed to produce a valid current GNSS location fix, the second receiver produces a current beacon list of detectable, identifiable beacons;

the current beacon list is compared to a prior beacon list associated in time with the last valid GNSS location update; and upon determining the presence of a limited-range beacon in both the current and prior beacon lists, the mobile device reuses a previously obtained valid GNSS location;

wherein the geographic location of the terrestrial beacon need not be known to use the beacon as a proxy for a location derived from satellite positioning signals; and wherein the method further comprises using both the GNSS receiver and the second receiver to collect information from each receiver concurrently, and to make a measurement of the beacon's transmit power and to compare the measurement to the beacon's transmit power recorded at a previous GNSS location fix, and based on the comparison to detect motion toward or away from the beacon.

31. A method as recited in claim 18, wherein the second receiver is implemented in a communications transceiver.

32. A method as recited in claim 31, wherein the method further comprises employing the communications transceiver to retry connecting with a cellular network to gather timing and signal data from multiple beacons.

33. A method as recited in claim 31, wherein the method further comprises employing the communications transceiver to create an active session with a cellular network and to use a failed session initiation to receive additional information from the network that is unavailable on a broadcast beacon.

34. A method as recited in claim 33, wherein the additional information comprises at least one of timing advance (TA), a received signal strength indicator (RSSI), and details on frequencies or identifiers of neighboring beacons.

35. A system for use in determining the location of a mobile device, comprising:

a global navigation satellite system (GNSS) receiver associated with the mobile device, configured to receive GNSS signals;

a second receiver associated with the mobile device, configured to receive a terrestrial beacon signal;

means for employing a controller associated with the mobile device to detect when GNSS signals are unavailable and, in response thereto, to use a received terrestrial beacon signal to determine whether a previous GNSS location update is valid, wherein the mobile device is configured to use the beacon as a proxy for a location derived from satellite positioning signals without knowing the geographic location of the terrestrial beacon;

means for employing the second receiver to acquire network parameters from the terrestrial beacon, said network parameters including at least one of timing advance and round-trip-time;

means for determining if a last known GNSS-derived location is still valid;

means for obtaining data from received beacon signals, wherein the data includes identifying information for a beacon and its network;

means for suspending GNSS searches and powering down the GNSS receiver in response to detecting that GNSS signals are unavailable; and means for performing the following steps:

employing the GNSS receiver to develop a first valid GNSS location including latitude, longitude, altitude, and timing;

in parallel, employing the second receiver to detect and identify one or more radio beacons in predefined transmission bands;

storing the first valid GNSS location and a first list of beacons locally within the mobile device;

entering the GNSS receiver into a low power sleep mode until a next required update time;

upon determining that the GNSS receiver has failed to produce a valid current GNSS location fix, producing with the second receiver a current beacon list of detectable, identifiable beacons;

comparing the current beacon list to a prior beacon list associated in time with the last valid GNSS location update; and upon determining the presence of a limited-range beacon in both the current and prior beacon lists, reusing a previously obtained valid GNSS location; and means for passively using received beacon signals from multiple beacons as a proxy for a high accuracy GNSS location estimate by measuring and comparing the strengths of signals received from neighboring beacons during periodic sampling events.

36. A system as recited in claim 35, wherein the mobile device is integrated into one of a mobile phone, a personal or automobile navigation system, and a tag device; and wherein the mobile device is battery powered.

37. A system as recited in claim 35, wherein the GNSS receiver and second receiver are implemented in a software defined radio (SDR).

38. A system as recited in claim 35, wherein the system further comprises means for determining network timing from frames transmitted by the beacon.

39. A system as recited in claim 38, wherein the system further comprises means for receiving at least one of a pilot channel signal and a synchronization channel signal from the beacon.

40. A system as recited in claim 38, wherein the system further comprises means for receiving beacon transmissions including at least one of a broadcast control channel of a cellular network and a beacon frame of an IEEE 802.11 network.

41. A system as recited in claim 38, wherein the system further comprises means for receiving beacon identifiers including at least one of a cell-ID in a CDMA or UMTS cellular network, a cell-global-identifier (CGI) in a GSM cellular network, and a base station identifier in an IEEE 802.11 wireless local area network.

42. A system as recited in claim 35, wherein the second receiver is implemented in a communications transceiver.

43. A system as recited in claim 42, wherein the system further comprises means for employing the communications transceiver to retry connecting with a cellular network to gather timing and signal data from multiple beacons.

44. A system as recited in claim 42, wherein the system further comprises means for employing the communications transceiver to create an active session with a cellular network and to use a failed session initiation to receive additional information from the network that is unavailable on a broadcast beacon.

45. A system as recited in claim 44, wherein the additional information comprises at least one of timing advance (TA), a received signal strength indicator (RSSI), and details on frequencies or identifiers of neighboring beacons.

46. A system for use in determining the location of a mobile device, comprising:
- a global navigation satellite system (GNSS) receiver associated with the mobile device, configured to receive GNSS signals;
- a second receiver associated with the mobile device, configured to receive a terrestrial beacon signal;
- means for employing a controller associated with the mobile device to detect when GNSS signals are unavailable and, in response thereto, to use a received terrestrial beacon signal to determine whether a previous GNSS location update is valid, wherein the mobile device is configured to use the beacon as a proxy for a location derived from satellite positioning signals without knowing the geographic location of the terrestrial beacon;
- means for employing the second receiver to acquire network parameters from the terrestrial beacon, said network parameters including at least one of timing advance and round-trip-time;
- means for determining if a last known GNSS-derived location is still valid;
- means for obtaining data from received beacon signals, wherein the data includes identifying information for a beacon and its network;
- means for suspending GNSS searches and powering down the GNSS receiver in response to detecting that GNSS signals are unavailable; and
- means for performing the following steps:
  - employing the GNSS receiver to develop a first valid GNSS location including latitude, longitude, altitude, and timing;
  - in parallel, employing the second receiver to detect and identify one or more radio beacons in predefined transmission bands;
  - storing the first valid GNSS location and a first list of beacons locally within the mobile device;
  - entering the GNSS receiver into a low power sleep mode until a next required update time;
  - upon determining that the GNSS receiver has failed to produce a valid current GNSS location fix, producing with the second receiver a current beacon list of detectable, identifiable beacons;
  - comparing the current beacon list to a prior beacon list associated in time with the last valid GNSS location update; and
  - upon determining the presence of a limited-range beacon in both the current and prior beacon lists, reusing a previously obtained valid GNSS location; and
- means for performing a process including the following steps, whereby the device determines whether a previous GNSS location update is valid:
  - the GNSS receiver is employed to develop a first valid GNSS location including latitude, longitude, altitude, and timing;
  - in parallel, the second receiver is employed to detect and identify one or more radio beacons in predefined transmission bands, wherein the radio beacons comprise broadcast signals from cellular network transmitters;
  - the GNSS location information is passed to a location-consuming application;
  - the GNSS receiver enters a low power sleep mode until a next required update time as determined by the location-consuming application;
  - the second receiver enters a low power sleep mode until the next required update time; upon determining that the GNSS receiver has failed to produce a valid GNSS location fix, the second receiver produces a current beacon list of detectable, identifiable beacons;
  - the current beacon list is compared to a prior beacon list associated in time with the last valid GNSS location update, and one of relative timing and power differences between beacon signals are used to determine an approximate change in location; and
  - based on the approximate change in location, the mobile device determines the validity of last valid GNSS location.

* * * * *